United States Patent

[11] 3,578,964

[72] Inventor Ralph H. Sherman
    217 Central St., Georgetown, Mass. 01830
[21] Appl. No. 792,633
[22] Filed Jan. 21, 1969
[45] Patented May 18, 1971

[54] VEHICLE IDENTIFICATION LIGHT
    4 Claims, 4 Drawing Figs.

[52] U.S. Cl. .................................................. 240/8.1, 343/715
[51] Int. Cl. .............................................. B60q 1/26
[50] Field of Search .................................. 240/8.1, 8.1 (A); 343/713, 715

[56] References Cited
    UNITED STATES PATENTS
    3,439,326  4/1969  Boudin ........................ 240/8.1X
    3,363,092  1/1968  Harling et al. ................ 240/84X
    3,287,549  11/1966  Lantery ....................... 240/8.1
    2,880,265  3/1959  Race ........................... 343/713X
    2,791,678  5/1957  Ferman ........................ 240/8.1

Primary Examiner—Samuel S. Matthews
Assistant Examiner—Michael Harris
Attorney—Robert S. Smith ABSTRACT: A light attachment to an automotive vehicle for identifying it rapidly in a crowded parking lot, comprises an upwardly telescopic staff carrying a lamp upon the upper end thereof. The lamp is electrically powered by conductor wires extending downwardly through the staff and connected to the automobile battery electrical power.

Patented May 18, 1971
3,578,964
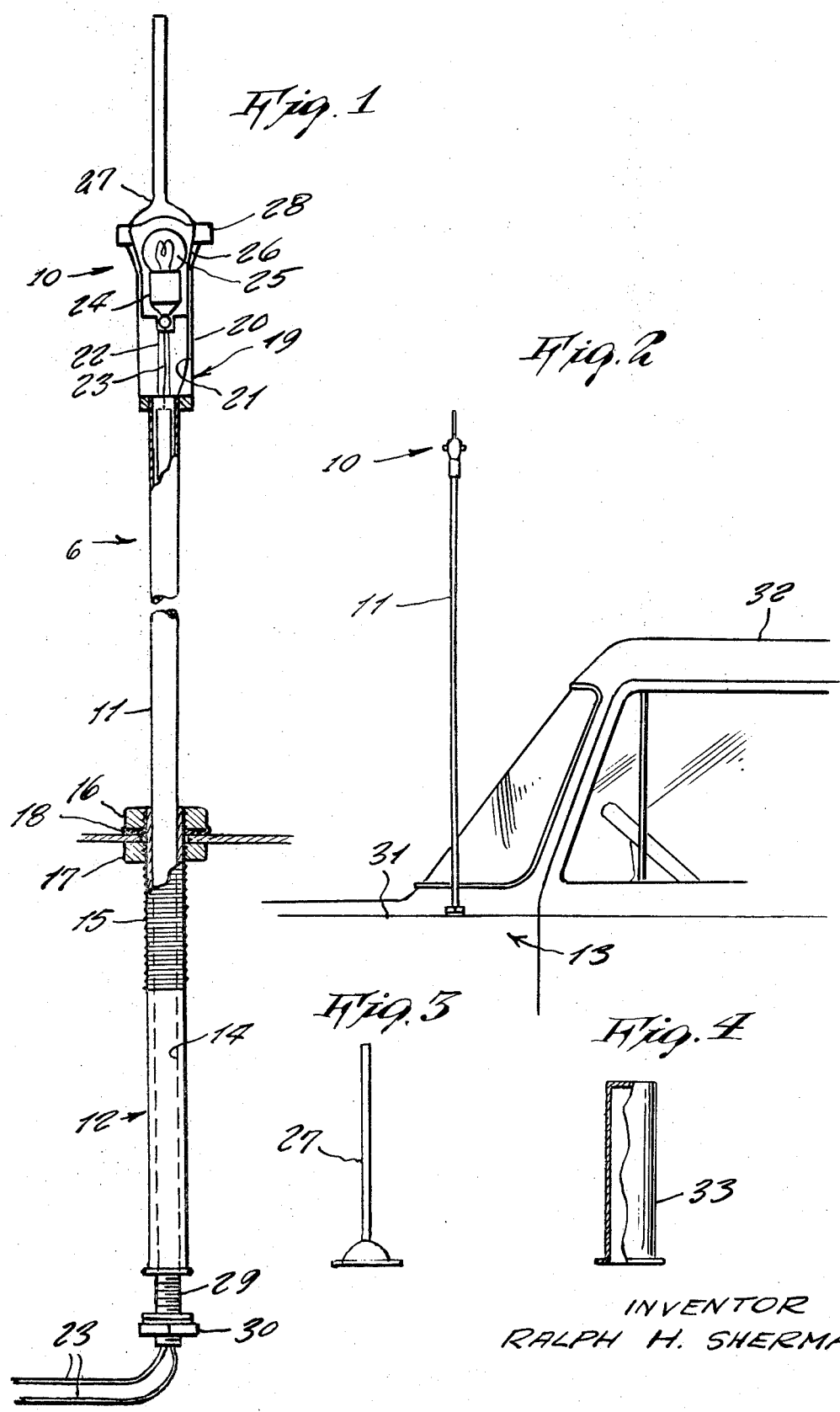
INVENTOR
RALPH H. SHERMAN

VEHICLE IDENTIFICATION LIGHT

This invention relates generally to indicating markers. More specifically, it relates to upstanding markers for identifying the location of automotive vehicles.

A principle object of the present invention is to provide an automobile identifier for readily locating an automobile in a crowded parking lot at night.

Another object of the present invention is to provide an automobile identifier which includes an illuminated lamp at the top of a staff mounted upon the automobile body so as to visibly locate the vehicle.

Yet another object is to provide an automobile identifier wherein the staff is vertically telescopic so as to be out of the way and to be in an elevated position above the vehicle when in operative use.

Yet a further object is to provide an automobile identifier wherein the lamp may glow in any one of several different colors so as to be more distinguishable among other automotive vehicles having a like structure incorporated thereupon.

Other objects of the present invention are to provide an automobile identifier which is simple in design, inexpensive to manufacture, rugged in construction, easy to use and efficient in operation.

These and other objects will be readily evident upon a study of the following specification and the accompanying drawing wherein:

FIG. 1 is a side elevation view of the present invention shown per se,

FIG. 2 is a side elevation view thereof shown mounted upon an automotive vehicle, FIG. 3 is a side elevation view of a spike-type crown, and FIG. 4 is a side elevation view of a hollow-type crown.

Referring now to the drawing in detail, the reference numeral 6 represents an automobile identifier, according to the present invention, wherein there is a tubular staff 11 having a lamp 10 mounted upon the upper end thereof, the lower portion of the staff being supported within a sleeve 12 rigidly affixed to the automobile body 13.

The sleeve 12 comprises a tubular member 14 that is of a size to be snug slide fit with the tubular staff 11 there within. The upper end of the sleeve is externally threaded 15 so as to threadingly engage a pair of nuts 16 and 17 between which there is located a rubber pad 18.

The lamp 10 comprises a main body 19 rigidly affixed upon the upper end of the staff, the main body 19 including an outer sleeve 20 with an inner liner of insulation 21. A central opening 22 is provided vertically through the main body, for the purpose of allowing conductor wires 23 there through. A bulb socket 24 is mounted in the upper portion of the main body 19, the bulb socket supporting a bulb 25 around which there is a reflector 26. A one-piece plastic lens and spike 27 is positioned over the lamp and reflector and is secured to the main body by means of a retaining ring 28. The plastic lens and spike 27 may be comprised either one of five different colors such as orange, red, yellow, green or blue.

The lower end of the staff is threaded 29, so as to engage a stop nut 30 mounted thereupon. The conductor wires 23 extend out of the lower end of the staff 11 and are connected to the electrical supply of the automotive vehicle.

In operative use, the device is mounted, as shown in FIG. 2 of the drawing, wherein the sleeve 12 is secured upon the fender 31 of the automobile body by first drilling opening 32 vertically through the fender 31 so as to allow the upper end of the sleeve to extend there through. The rubber pad 18 and the upper nut 16 are secured upon the upper side of the fender while the nut 17 is secured against the lower side thereof thus firmly locking the sleeve in a fixed position to the automotive vehicle. When it is desired to provide illuminated identification for the vehicle in a crowded parking lot, the staff 11 is then raised upwardly in an extended position so that the lamp 10 is positioned high over the roof 32 of the vehicle so that it may be seen from a relatively great distance. This device would be particularly useful in drive-in theatres where persons are known to leave the vehicle occasionally and go to a snack bar for food and then return back to the car. Thus the illuminated lamp would readily identify the location of the car. An electric switch could be conveniently located on the dashboard, if preferred, for turning the lamp on and off. In a modified construction, as shown in FIG. 4 of the drawing, the spike-type crown 27 could be substituted by a hollow-type crown 33, as shown in FIG. 4 of the drawing. It is of course readily appreciated that in case the spike-type crown is used, the same will remain operative even if the upper end thereof is broken off, thus allowing the lower portion of the same to continue glowing, in view that the spike-type comprises a solid spike construction.

I claim:

1. In an automobile identifier, the combination of a vertical staff mounted telescopingly in a sleeve secured to an automobile body, said staff having a lamp at the upper end thereof, said staff being hollow to allow conductor wires extending downwardly there through from said lamp into an electrical supply of said automotive vehicle, said sleeve being a tubular member having a central opening therethrough which is of a diameter for slide fit with said staff vertically telescopic there within, the upper end of said sleeve being externally threaded and threadingly engaging a pair of nuts between which there is a rubber pad, said rubber pad being positioned adjacent an upper side of an automotive vehicle body upon which said automobile identifier is secured, said lower end of said staff being externally threaded and threadingly engaging a stop nut secured thereto for limiting upward traveling of said staff within said sleeve, and said tubular staff in an extended position extending upwardly above a roof of said automotive vehicle so to be unobstructively seen from all sides of said car, said lamp being a main body including an outer sleeve with an inner liner of insulation, a central opening extending through said main body for receiving said conductor wires, a bulb socket within the upper end of said main body, said bulb socket supporting a bulb, a reflector around said bulb, a plastic lens over said reflector and bulb, said plastic lens being secured upon said main body by a retaining ring, said plastic lens further including an upwardly extending spike of solid plastic.

2. The combination as set forth in claim 1, wherein said plastic lens and spike are constructed of unitary clear transparent plastic.

3. The combination as set forth in claim 2, wherein said plastic lens and spike comprises a tubular surface having a diameter greater than said shaft.

4. The combination as set forth in claim 1 wherein said plastic lens and spike are constructed of unitary colored plastic.